US010442471B2

(12) United States Patent
Tulett et al.

(10) Patent No.: US 10,442,471 B2
(45) Date of Patent: Oct. 15, 2019

(54) ROOF HEADER MODULES IN A VEHICLE

(71) Applicant: Ford Global Technologies LLC, Dearborn, MI (US)

(72) Inventors: Daniel Eric Tulett, Williamstown (AU); Gaetano D'Agata, Melbourne (AU); Raviraj Uchil, Campbellfield (AU)

(73) Assignee: Ford Global Technologies LLC, Dearborn, MI (US)

( * ) Notice: Subject to any disclaimer, the term of this patent is extended or adjusted under 35 U.S.C. 154(b) by 25 days.

(21) Appl. No.: 15/895,303

(22) Filed: Feb. 13, 2018

(65) Prior Publication Data

US 2018/0281868 A1 Oct. 4, 2018

(30) Foreign Application Priority Data

Mar. 29, 2017 (CN) .......................... 2017 1 0197727

(51) Int. Cl.
| | | |
|---|---|---|
| B62D 25/04 | (2006.01) | |
| B62D 29/00 | (2006.01) | |
| B62D 27/02 | (2006.01) | |
| B60J 1/00 | (2006.01) | |
| B60R 1/12 | (2006.01) | |
| B60R 1/04 | (2006.01) | |
| B62D 25/06 | (2006.01) | |
| B60J 3/00 | (2006.01) | |
| B60R 13/02 | (2006.01) | |
| B60J 3/02 | (2006.01) | |

(52) U.S. Cl.
CPC .............. *B62D 25/06* (2013.01); *B60J 1/006* (2013.01); *B60J 3/00* (2013.01); *B60J 3/0204* (2013.01); *B60J 3/0243* (2013.01); *B60R 1/04* (2013.01); *B60R 1/12* (2013.01); *B60R 13/0212* (2013.01); *B62D 25/04* (2013.01); *B62D 27/02* (2013.01); *B62D 29/007* (2013.01); *B60R 2001/1238* (2013.01)

(58) Field of Classification Search
CPC ...... B62D 25/06; B62D 25/04; B62D 29/007; B62D 27/02; B60J 1/006; B60J 3/0243; B60J 3/0204; B60J 3/00; B60R 1/04; B60R 1/12; B60R 13/0212; B60R 2001/1238
USPC ....................................................... 296/24.34
See application file for complete search history.

(56) References Cited

U.S. PATENT DOCUMENTS

| | | | |
|---|---|---|---|
| 4,958,878 A | 9/1990 | Kempkers | |
| 5,018,783 A | 5/1991 | Chamings et al. | |
| 5,105,521 A * | 4/1992 | Dowd | B60N 3/023 29/214 |
| 5,303,970 A | 4/1994 | Young et al. | |

(Continued)

*Primary Examiner* — Joseph D. Pape
*Assistant Examiner* — Dana D Ivey
(74) *Attorney, Agent, or Firm* — Vichit Chea; Kolitch Romano LLP

(57) ABSTRACT

Roof header modules in a vehicle comprises a base configured to interface with a windshield, a headliner and an A-pillar. The plurality of components is attached to the base through a plurality mounts designed to receive the plurality of the components. The plurality of components may include one of a sun visor, a vanity mirror, an overhead console, rear view mirror or monitor, a rain sensor, a camera, and/or a radar and may be attached by mounts. The roof header module is a preassembled single piece.

19 Claims, 4 Drawing Sheets

(56) References Cited

U.S. PATENT DOCUMENTS

| | | | |
|---|---|---|---|
| 6,575,528 B2 * | 6/2003 | Tiesler | B60R 7/04 296/214 |
| 6,824,185 B2 | 11/2004 | Tiesler et al. | |
| 6,975,215 B2 | 12/2005 | Schofield et al. | |
| 2013/0214548 A1 * | 8/2013 | Harders | B60R 13/0206 296/24.34 |

* cited by examiner

ROOF HEADER MODULES IN A VEHICLE

RELATED APPLICATION

This application claims the benefit of Chinese Patent Application No.: CN 201710197727.7 filed on Mar. 29, 2017, the entire contents thereof being incorporated herein by reference.

FIELD

The present disclosure relates generally to roof header modules in a vehicle, and in particular, to a roof header module which is separately formed from a headliner.

BACKGROUND

Headliners are placed on the interior of vehicle above passengers' heads to cover a metal car frame and create a finished look to the interior of the vehicle. Traditionally, headliners have been a single piece covering an entire roof. Components such as sun visors, vanity mirrors and headlamps are usually disposed on the headliner. Assembling of these component into the headliner involves additional final line processes and add to the cost of production. Further, pre-assembling components into the headliner can increase the weight of the headliner to an unacceptable level. Additionally, the A-pillar to headliner interface is highly visible to the occupants of the vehicle and can be poorly executed. The inventors have recognized that there is need for a roof header module to address some of the issues mentioned above.

SUMMARY

According to one aspect, a roof header module in a vehicle is provided. The roof header module includes a base configured to interface with a windshield, a headliner, and an A-pillar; and a plurality of components attached to the base, and the base includes a plurality mounts to receive the plurality of components.

In one embodiment, the plurality of the components may include a sun visor and a vanity mirror.

In another embodiment, the plurality of the components may further include one of an overhead console and a rear view mirror.

In another embodiment, the plurality of the component may further include a rain sensor, a camera and a radar.

In another embodiment, the base may include a channel to hold wiring harness of the rain sensor, the camera and the radar.

In another embodiment, the base may be made of hard plastic and formed in an injection molding.

In another embodiment, the mounts of the base may include recesses opened to a first side to receive the vanity mirror and the sun visor, and the channel opened at a second side to hold the wiring harness, and wherein the mounts are integrally formed with the base.

In another embodiment, the mounts of the base may include an opening for attachment of the overhead console.

According to another aspect, a roof header module in a vehicle is provided. The roof header module comprises a base including a plurality of mounts; and a plurality of components attached to the mounts in the base. The base and the plurality of components are preassembled to form a single module and the base is configured to be fit between a windshield and a headliner.

In one embodiment, the plurality of components includes at least one of two sun visors, two vanity mirrors and an overhead console.

In another embodiment, the base may further include a plurality of coupling mounts to provide connection point with a sheet metal of a vehicle roof or a header panel disposed between the sheet metal of the vehicle roof and the base and to reinforce strength of the base. The coupling mounts may be integrally formed with the base.

In another embodiment, the base may include a curved edge or a straight edge at a side adjacent to the headliner.

According to another aspect, a vehicle is provided to comprise a windshield; an A-pillar; a headliner, and a roof header module disposed between the windshield and the headliner. The roof header module includes a base, and a plurality of components attached to the base, and the roof header module is a separate piece from the headliner.

In one embodiment, the plurality of components may include at least one of a sun visor, a vanity mirror, a rear view mirror and a plurality of sensors.

In another embodiment, the base may be made from hard plastic and is formed in an injection molding.

In another embodiment, the base may be attached to sheet metal of a vehicle roof by a bolt, screw, adhesive, or snap attachment.

In another embodiment, the roof header module is assembled to the sheet metal of a vehicle roof after the headliner is assembly.

In another embodiment, the base and the A-pillar trim may be a hard to hard interface.

In another embodiment, an edge portion of the base may be disposed under the A-pillar trim.

In another embodiment, a spaced between the windshield and the headliner may be configured such that the base is further interference fit with the headliner.

The roof header modules of the present disclosure is a single piece preassembled with the components that are normally attached to the headliner in that area. With the separate header module, the headliner becomes shorter in a length direction and less heavy while the roof header module can be assembled off line, which achieves better ergonomics.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed roof header modules will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various roof header modules are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
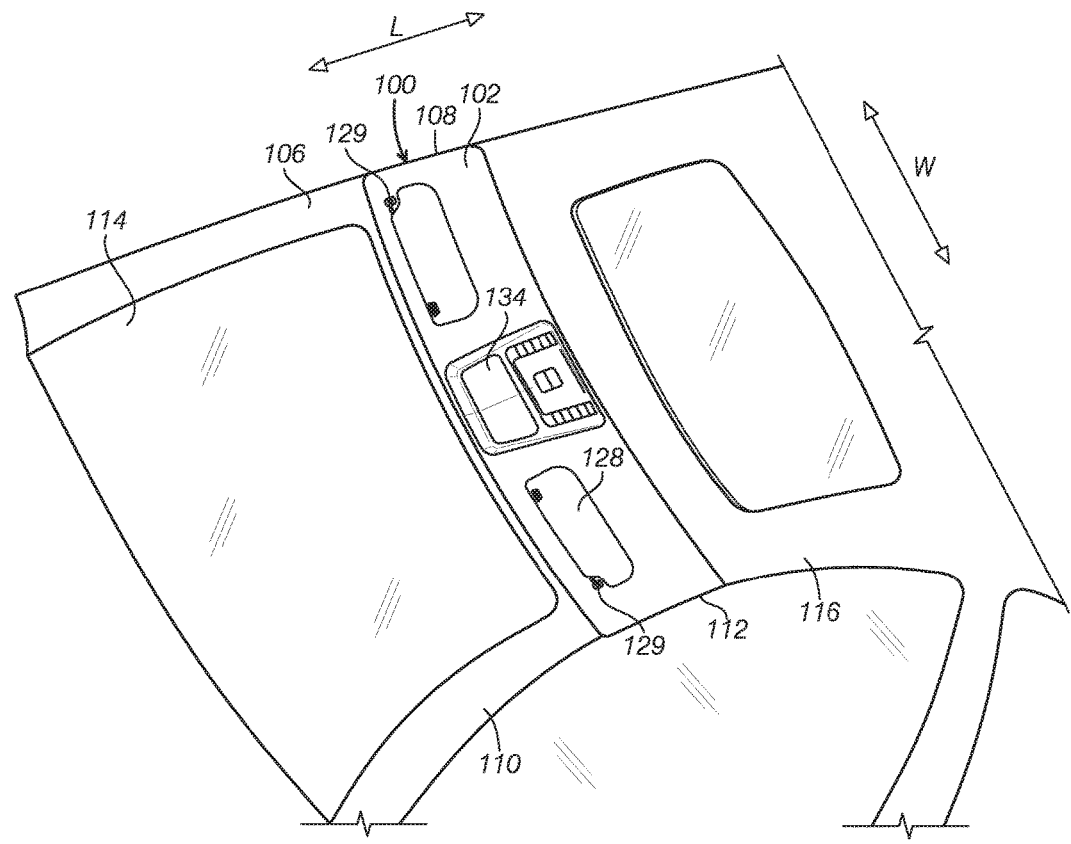
FIG. 1 is a perspective view of a first example embodiment of a roof header module on the interior of a vehicle according to the present disclosure.

With reference to FIG. 1, a first example of a roof header module in a vehicle, header module 100, will now be described. In the depicted embodiment, header module 100 is illustrated to interface with various parts of a vehicle. The reader will appreciate from the figures and description below that a roof header module 100 addresses shortcomings of conventional headliners. For example, the roof header module 100 is formed as a single piece, reducing manufacturing costs. Additionally, the roof header module 100 incorporates a plurality of the components included on the interior of a vehicle. By incorporating the components commonly located on the roof of the vehicle, the roof header module 100 can be pre-assembled and later installed in the vehicle, reducing costs further.

FIG. 1 shows a partial vehicle, illustrating the roof header module 100 disposed on the roof, and interface of the roof header module 100 with a windshield, A-pillars and headliner. The roof header module 100 includes a base 102 that may attach across a width of an interior of a vehicle and may include a plurality of mounts, each capable of receiving a component. For example, the base 102 may be disposed on a metal roof of the vehicle and may extend from a first A-pillar 106 and first side rail 108 of the vehicle to a second A-pillar 110 and second side rail 112 of the vehicle, across a width of the interior of the vehicle and extend along a lengthwise direction L of the vehicle. As seen in FIG. 1, attached on the interior of the vehicle to the sheet metal of a vehicle's roof is a headliner 116 which covers a majority portion of the sheet metal of the vehicle roof. The headliner 116 may be attached to the sheet metal of the vehicle roof with adhesive, screws, bolts, snap fittings, or another attachment mechanism. The vehicle may also include a windshield 114 disposed between the first A-pillar 106 and the second A-pillar 110.

Still as seen in FIG. 1, the roof header module 100 may be disposed on the interior of the vehicle across an entire width of the vehicle between the windshield 114 and the headliner 116, and covers a portion of the vehicle roof. In other words, the roof head module 100 and the headliner together cover the entire sheet metal of the vehicle roof.

Still as seen in FIG. 1, the header module 100 may be disposed on and attached to the sheet metal of the vehicle roof on the interior of the vehicle between the windshield 114 and the headliner 116. In some embodiments, the base of the roof header module 100 may have a rectangular shape.

As can be seen in FIG. 1, the roof header module 100 may include a plurality of components, each attached to the base 102 by a mount. These components may be customizable and adaptable for different vehicles or preferences. In some embodiments, the components may include two sun visors 128, and an overhead console 134. The sun visor 128 may be attached to a hook 129 and may be folded, unfolded or rotated around. In one example, a vanity mirror may be disposed on an interior of the sun visor 128. In another example, an electronic device such as a smart phone, a tablet may be disposed on the sun visor at the passenger side. A roof header module 100 allows for customization of the components to be incorporated on the roof header.

As shown in FIG. 1, the base 102 may include a plurality of mounts configured to receive and fix the components. The mounts may be located at various positions for the various components and customized for each component. The base 102 may be made from hard plastic and formed in an injection molding. At least some mounts may be formed integrally with the base. For example, the mounts may include openings and cavities formed integrally with the base 102. In another example, the mounts may include connection structures such as protrusions, recesses, clips, hooks, reels integrally formed with the base 102. In yet another example, the mounts may be added to the base 102 via any suitable approaches for fixing the components.

Figure 2:
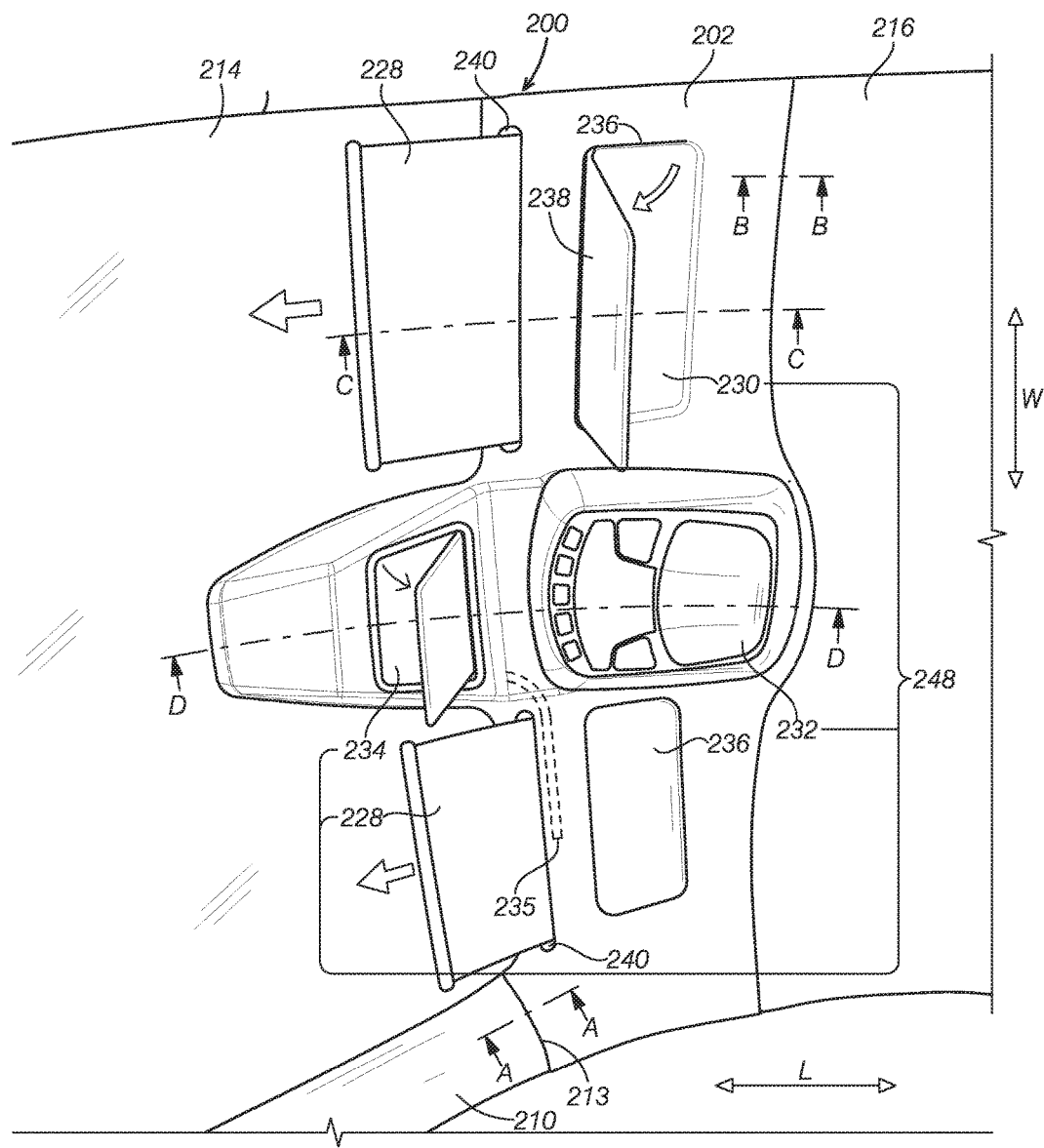
FIG. 2 is a perspective view of a second example of a roof header module on the interior of a vehicle.

Turning now to FIGS. 2-6, FIG. 2 shows a view of another embodiment of a roof header module 200 viewed from the inside of a vehicle, and FIGS. 3-6 illustrate the interfaces of the roof header module 200 with other vehicle components. As shown in FIG. 2, the roof header module 200 is disposed between a headliner 216 and a windshield 214. The roof header module 200 includes a base 202 and a plurality of components disposed on the base 202. The roof header module 200 may be a preassembled module separate from the headliner 216. In some embodiments, the roof header module 200 may be assembled after the headliner 216 is assembled to the sheet metal of the roof. The roof header module 200 may be attached to the sheet metal of the vehicle roof via any suitable approaches such as adhesives, screws, clips or magnetic connectors. Additionally, or alternatively, a space between the windshield 214 and the headliner 216 may be configured such that the roof header module 200 further has an interference fit with the headliner 216.

The base 202 of the roof header module 200 may be made from hard plastic with appropriate color. For example, the headliner 216 commonly includes a soft cover such as a fabric layer as an outer layer. The base 202 may be made from plastic with a matching color as the fabric of the headliner 216 or other color for styling purpose. Further, the shape of the base 212 may be customized for styling purpose as well for a specific model of vehicle.

FIG. 2 further shows a plurality of components 248 included in the roof header module 200. In some embodiments, the plurality of components 248 comprise sun visors 228, vanity mirrors 230, an overhead console 232, and a rear view mirror 234. In some embodiments, the roof header module 200 may further include electronic devices such as one of a rain sensor, a rear view camera, a radar or a sun sensor. The electronic devices may be disposed at any suitable position on the roof header module 200. For example, one or more electronic devices may be disposed in a storage area adjacent to the rear view camera. In some embodiments, the roof header module 200 may further include some components that are otherwise unfeasible to attach to a conventional headliner because of their weight. For example, a device holder or an object holder may be attached to the roof header module 200 which may be concealed at a non-use position and extended out at a use position. Any customized components may be incorporated into the roof header module.

Continuing with FIG. 2, the base 202 may include various mounts for attaching the components. Some mounts may be integrally formed with the roof header module 200. For example, the base 202 may include two recess 236 configured to receive the vanity mirror 230. In some embodiments, a mirror cover 238 may be integrally formed with the base 202. In some embodiments, the sun visor 228 may be a sliding-rolling type. The base 202 may include elongated openings 240 to allow the sun visor 228 to slide through. Further, a reel may be integrally formed or attached on a nonvisible side of the base 202 to enable the extension and the retraction of the sun visor 228.

The base 202 may further include one mount configured to receive a storage bin. For example, the overhead console 232 may be disposed on a first cavity-shaped mount which may be integrally formed on the base 202 or attached to the base 202. Similarly, the base 202 may include a second cavity-shaped mount to hold the rear view mirror 234. The first and second cavity-shaped mounts may contain other components such as a radar sensor to detect a front object, a rear view camera, a rain sensor or other sensors.

Continuing with FIG. 2, extending from the packaging area 258 is a channel 235, which may be a space or void in the base 202, or between the base 202. The channel 235 may be configured to hold harness wiring for any electrical components included on header module 200.

Figure 3:
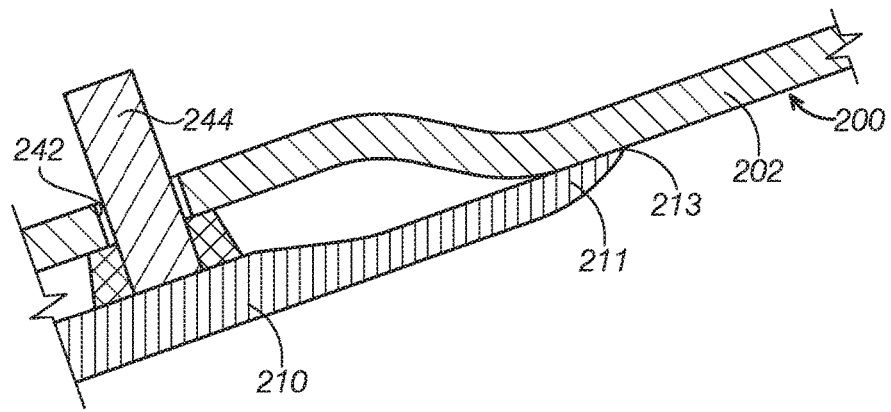
FIG. 3 is a cross-sectional view of the roof header module in FIG. 2, depicting a cross section of the interface of the roof header module and A-pillar.

Turning to FIG. 3, the connection between the roof header module 200 and the base 202 of the roof header module 200 is illustrated. In the depicted embodiment, the base 202 of the roof header module 200 may first attach to the sheet metal of A-pillar 210 via an attachment mechanism 244 such as a screw, bolt, snap fitting, or other attachment. For example, a fastener (bolt/nut) may pass through a hole 242 to attach the roof header module to the sheet metal of the vehicle roof (not shown). After the base 202 is attached to the A-pillar 210, a hard pillar trim 246 may snap over the base 202 to conceal the attachment mechanism, creating an aesthetically pleasing look. An edge portion 211 of the A-pillar 210 may contact a surface of the base 202. An interface 213 between the A-pillar 210 and the base 202 of the roof header module 200 is a hard to hard interface, which creates a clean and smooth appearance.

Figure 4:
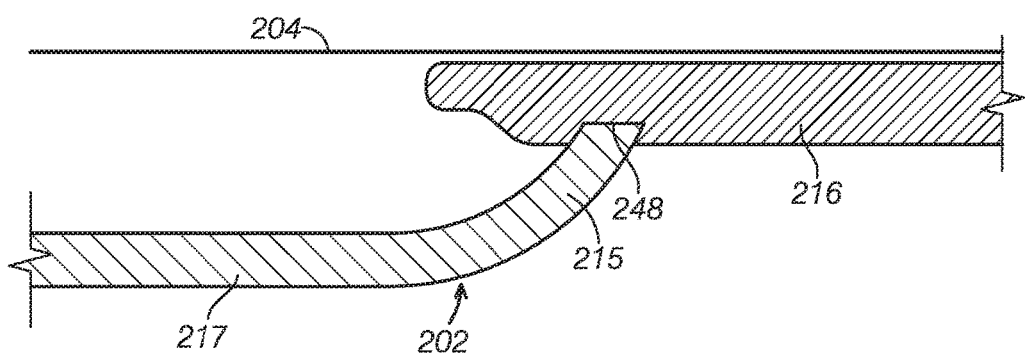
FIG. 4 is a cross-sectional view of the roof header module in FIG. 2, depicting a cross section of the interface of the roof header module and headliner.

Turning to FIG. 4, a cross-sectional view along line B-B is shown, illustrating components and mounts on the roof header module 200. The header module 200 may interface with the headliner of the vehicle through an interference fit or snap fit. In some embodiments, the headliner 216 is installed first via any suitable approaches conventionally used or later developed and create a space for assembling of the roof header module 200. After the assembling of the headliner 216, a first edge portion of the base 202 of the roof header module 200 may be attached to the sheet metal of A-pillar and the A-pillar trim via any suitable approaches as illustrated in FIG. 3. Next, the base 202 may be pressed into the space between the windshield and headliner 216 such that a second edge 215 has an interference fit with the headliner 216. It should be appreciated that the second edge 215 may connect the headliner 216 with transition fit or with any suitable attachment mechanism. Further, a main body 217 of the base 202 may be connected to the sheet metal of the vehicle roof 204 at a plurality of attachment points via any suitable approaches such as a clip, screw, or magnet connector fitting. The attachment points on the main body 217 may be adjacent to the components having certain weights and may need reinforced connections.

Figure 5:
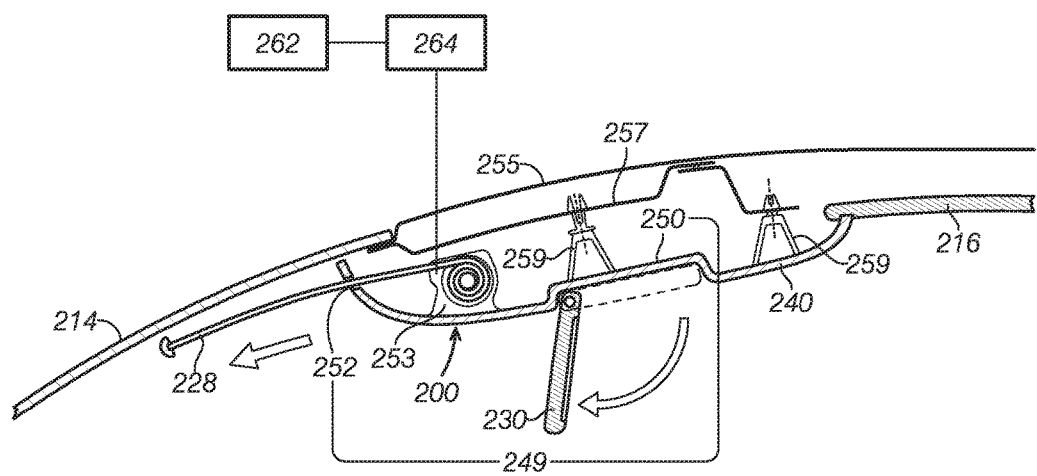
FIG. 5 is a cross-sectional view of the roof header module in FIG. 2, depicting a cross section of the components including the vanity mirror and sun visor.

Now turning to FIG. 5, a cross-sectional view along line C-C is shown, illustrating components and mounts 249 on the roof header module 200. The mounts 249 for the components may be located at various positions for the various components on the roof header module. For example, the mounts 249 may be a recess, void, or indentation on base 202 sized to accept into it one of the various components. For example, in the depicted embodiment, a first mount 250 is shown as a recess formed on a surface of a first side 240 of the roof header module to receive the vanity mirror 230. The first side 240 is a visible side or a side facing an interior of the vehicle. The vanity mirror 230 may be any shape with a slight thickness. Accordingly, the first mount 250 on the base 202 may be configured to receive the vanity mirror 230 and make a flush surface when the vanity mirror 230 is at a stowed position. The vanity mirror 230 may be pivotably connected to the base 202 to be rotated at the stowed position and an extended position.

As further seen in FIG. 5, additional mounts may be located on the base for additional components. In this example embodiment, the roof header module 200 includes a sliding-pulling type sun visor 228 and the second mount 252 may be an elongated opening to allow the sun visor 228 to move in and out. A reel 253 may be attached to the base 202 and the sun visor 228 may be wound on the reel 253. In some embodiments, the reel 253 may be a power operated reel and electrically communicated with a sun sensor 62 and a control unit 64. For example, the reel 253 may be activated and extend the sun visor 228 to a use position automatically when the control unit 64 determines that the angle of the sun is affecting a driver's line of sight based on the information from a sun sensor 62. The auto function may be override by the driver if the driver prefers not to deploy the sun visor. Similarly, the sun visor at the front passenger's side may also have a power operated sun visor and a manual override.

FIG. 5 also shows windshield 214, a metal roof panel 255 and a roof header panel 257 disposed between the metal roof panel 255 and the roof header module 200. The roof header panel 257 may be a sheet metal connected with the metal roof panel 255. The roof header module 200 is connected to the roof head panel 257 via any suitable approaches such as with a connection component 259. The connection component 259 may be integrally formed on the base 202 or attached to the base 202 via adhesive and then fixed to the roof header panel 257 via a screw or a nut/bolt.

Figure 6:
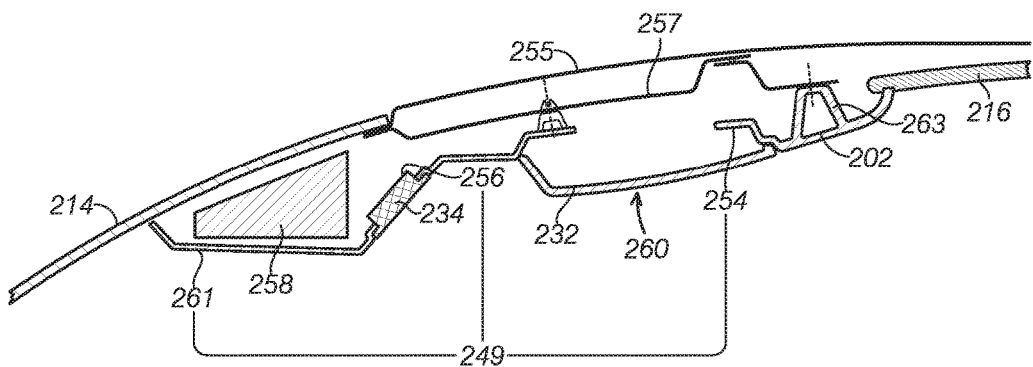
FIG. 6 is a cross-sectional view of the roof header module in FIG. 2, depicting a cross section of the components including the center console and rear view mirror in the center extension.

Now turning to FIG. 6, a cross-sectional view along line D-D is shown, illustrating components and mounts 249 on the roof header module 200. A third mount 254 is included on the base 202 to receive the overhead console 232. The third mount 254 may be a cavity formed on the base 202 to accommodate the overhead console 232. The overhead console 232 may include a storage area for items like sunglasses, and may also contain features such as head lamps, remote openers, or light indicators. The overhead console 232 may attach to the base 202 at the third mount 254 using any suitable approaches such as a screw, bolt, snap fitting, or an adhesive.

Still referring to FIG. 6, additional components may be included in the center extension. In this example, a fourth mount 256 formed as a recess on the base 202 to receive the rear view mirror 234, which may also be a monitor. The rear view mirror 234 may be attached to the mount 256 by snap fit, adhesive, screws, bolts, or other attachment mechanisms.

Still referring to FIG. 6, in some embodiments, the base 202 may include a packaging area where electronic components may be housed or stored. A fifth mount 261 may be formed on the base 202 to create the package area 258. For example, in this embodiment, packaging area 258 is a space or void located on the base 202 to house the rain sensor 236, camera 238, radar 260, and other various components. The fifth mount 261 may be formed integrally with the base or formed as a separate piece and attached to the base 202.

FIG. 6 also shows windshield 214, a metal roof panel 255 and a roof header panel 257 disposed between the metal roof panel 255 and the roof header module 200. A coupling component 263 formed on the base 202 is shown at this cross section. In the depicted embodiment, the coupling component 263 is a hollow body, which provides a connection point with the roof header panel 257 and may further function to increase the strength of the base 202.

The roof header modules of the present disclosure are advantageous in several aspects. For example, the roof header module is a single piece preassembled with the components that are normally attached to the headliner in that area. With the separate header module, the headliner becomes shorter in a length direction and less heavy while the roof header module can be assembled off line, which achieves better ergonomics. In some embodiments, the base of the roof header module is made from hard plastic and include a plurality of mounts and thus it is easy to assemble the components to the base. Furthermore, the interface between the A-pillar and the roof header module is a hard to hard interface and allows more refinement in the joint.

It should be appreciated that a soft cover such as a fabric cover may be disposed on the base as an outer layer if it is desired to have uniform interior of the roof. Alternatively, a portion of the roof header module may have a hard surface and a portion of the roof header module may have a soft surface for aesthetic appearance or for better connection at some interfaces. Various modification is possible with the preassembled roof header module.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A roof header module in a vehicle, comprising:
   a base disposed between a windshield and a headliner along a lengthwise direction and attached to a sheet metal of the vehicle; and
   a plurality of components attached to the base and included on an interior of the vehicle,
   wherein the base extends across a width of an interior of the vehicle, is configured to interface with the windshield, the headliner and an A-pillar, wherein the base includes a plurality mounts to receive corresponding plurality of the components, and wherein the roof header module is a preassembled piece separate from the headliner.

2. The roof header module of claim 1, wherein the plurality of the components includes a sun visor and a vanity mirror.

3. The roof header module of claim 2, wherein the plurality of the components further includes one of an overhead console and a rear view mirror.

4. The roof header module of claim 3, wherein the plurality of the components further includes one of a rain sensor, a camera, a radar, and a sun sensor.

5. The roof header module of claim 4, wherein the base includes a channel to hold wiring harness of one of the rain sensor, the camera, the radar, and a sun sensor.

6. The roof header module of claim 5, wherein the base is made of hard plastic.

7. The roof header module of claim 6, wherein the mounts of the base include recesses opened to a first side to receive the vanity mirror and the sun visor, and the channel opened at a second side to hold the wiring harness, and wherein the mounts are integrally formed with the base.

8. The roof header module of claim 7, wherein the mounts of the base include a cavity to receive the overhead console.

9. A roof header module in a vehicle, comprising:
   a base including a plurality of mounts; and
   a plurality of components to be included on an interior of the vehicle and attached to the corresponding mounts on the base,
   wherein the base and the plurality of components are preassembled to form a single module and the base is disposed between a windshield and a headliner along a lengthwise direction and extends across a width of the vehicle, and configured to be fit between the windshield and the headliner, and wherein the roof header module and the headliner together cover an entire sheet metal of the vehicle roof.

10. The roof header module of claim 9, wherein the plurality of components includes at least one of two sun visors, two vanity mirrors and an overhead console.

11. The roof header module of claim 9, wherein the base further includes a plurality of coupling mounts to provide connection points with a sheet metal of a vehicle roof or a header panel disposed between the sheet metal of the vehicle roof and to reinforce strength of the base, and wherein the coupling mounts are integrally formed with the base.

12. The roof head module of claim 9, wherein the base includes a curved edge or a straight edge at a side adjacent to the headliner.

13. A vehicle, comprising:
a windshield;
an A-pillar;
a headliner; and
a roof header module disposed on a sheet metal of a vehicle roof between the windshield and the headliner along a lengthwise direction of the vehicle and extending across a width of the vehicle, wherein the roof header module includes a base, and a plurality of components attached to the base, and the roof header module is a separate piece from the headliner, wherein the roof header module and the headliner together cover an entire sheet metal of the vehicle roof, and
wherein the plurality of components include at least one of a sun visor, a vanity mirror, a rear view mirror and a plurality of sensors, and
wherein the base includes a plurality of mounts corresponding to the plurality of components.

14. The vehicle of claim 13, wherein the base is made from hard plastic.

15. The vehicle of claim 13, wherein the base is attached to sheet metal of vehicle roof by a bolt, screw, adhesive, or snap attachment.

16. The vehicle of claim 13, wherein an edge portion of the base is disposed under the A-pillar trim.

17. The vehicle of claim 13, wherein a space between the windshield and the headliner is configured such that the base has further interference fit with the headliner.

18. The vehicle of claim 13, wherein the sun visor is a sliding-pulling type sun visor, and wherein a mount corresponding to the sun visor is an elongated opening to allow the sun visor to move in and out, and the sun visor is wound on a reel attached to the base and the reel is a power operated.

19. The vehicle of claim 18, wherein the reel is electrically communicated with a sun sensor and a control unit and the reel is activated to extend the sun visor to a use position when the control unit determines that an angle of sun light affects a driver's line of sight based on the information from the sun sensor.

* * * * *